United States Patent [19]

Phillips et al.

[11] Patent Number: 5,773,814

[45] Date of Patent: Jun. 30, 1998

[54] SENSOR ASSEMBLY PROVIDING GRAY SCALE AND COLOR FOR AN OPTICAL IMAGE SCANNER

[75] Inventors: Wayne G. Phillips, Loveland; Kenneth D. Gennetten, Fort Collins, both of Colo.; Paul M. Hubel, Mountain View, Calif.; David D. Bohn, Fort Collins, Colo.

[73] Assignee: Hewlett-Packard Company, Palo Alto, Calif.

[21] Appl. No.: 532,378

[22] Filed: Sep. 22, 1995

Related U.S. Application Data

[63] Continuation-in-part of Ser. No. 294,700, Aug. 23, 1994, abandoned.

[51] Int. Cl.[6] .............................. H01J 40/14; H04N 9/07
[52] U.S. Cl. ...................... 250/208.1; 250/226; 348/276; 358/514
[58] Field of Search ................................ 250/208.1, 226; 348/33, 342, 254, 273, 276; 382/58, 65; 358/505, 512, 513, 514, 515

[56] References Cited

U.S. PATENT DOCUMENTS

| | | | |
|---|---|---|---|
| 4,087,836 | 5/1978 | DeFoe | 348/276 |
| 4,479,143 | 10/1984 | Watanabe et al. | 348/276 |
| 4,721,999 | 1/1988 | Takemura et al. | 348/276 |
| 4,736,251 | 4/1988 | Sasaoka | 358/75 |
| 4,855,817 | 8/1989 | Watanabe | 358/75 |
| 4,939,573 | 7/1990 | Teranishi et al. | 348/276 |
| 5,191,409 | 3/1993 | Hamaguchi et al. | 358/505 |
| 5,229,595 | 7/1993 | Mikkelsen, Jr. et al. | 250/226 |
| 5,336,878 | 8/1994 | Boyd et al. | 250/208.1 |
| 5,361,145 | 11/1994 | Hasegawa | 358/514 |

FOREIGN PATENT DOCUMENTS 2217145   3/1989   United Kingdom .

OTHER PUBLICATIONS

Xerox Disclosure Journal, Jul./Aug. 1991, vol. 6, No. 4; FWA Chip Configurations for A Mid–Volume Color Scanner; Jagdish C. Tandon et al, pp. 259–260.

IBM Technical Disclosure Bulletin, vol. 20, No. 1, Jun. 1977; Silicon Solid–State FET Color Scanner; S.G. Chamberlin and D. L. Critchlow; pp. 436–437.

Patent Abstracts of Japan, vol. 14, No. 32; 22 Jan. 1990 & Jp–A–01 265; Tokyo Electric.

K.D. Gennetten & M.J. Steinle, "Designing A Scanner With Color Vision".

Hewlett–Packard Journal, vol. 44, No. 4, Aug. 1993, pp. 52–58.

Primary Examiner—Stephone Allen
Attorney, Agent, or Firm—Augustus W. Winfield

[57] ABSTRACT

A sensor assembly and an optical image color scanner using the sensor assembly. The sensor assembly is of the type having three separate rows of optical sensors. Two of the three sensor rows have color filters and one is unfiltered (receptive to white light). For gray scale scanning, only the unfiltered (white) sensor row is used, thereby maximizing the speed of gray scale scanning. For color scanning, three color values are computed as a linear transformation of values from the two filtered and one unfiltered values. The linear transformation may be as simple as subtracting signals from the two filtered sensor rows from the signal from the unfiltered (white) sensor row. For color scanning, memory buffers are required for two of the three sensor output signals. For highest accuracy in color scanning, the exposure time for the white sensor row is reduced relative to the exposure time for the two filtered sensor rows. An optional white channel bandpass filter (passing all wavelengths within the human visual range and rejecting wavelengths outside the human visual range) provides improved accuracy if the light source has significant wavelengths outside the human visual range.

20 Claims, 7 Drawing Sheets

SENSOR ASSEMBLY PROVIDING GRAY SCALE AND COLOR FOR AN OPTICAL IMAGE SCANNER

This is a continuation-in-part of application Ser. No. 08/294,700 filed on Aug. 23, 1994, now abandoned.

FIELD OF INVENTION

This invention relates generally to optical image scanners and light sensor assemblies for optical image scanners and more specifically to scanning both gray scale and color images with a color scanner.

BACKGROUND OF THE INVENTION

Optical image scanners convert printed pages, photographs, transparent images and other images from paper or film into a digital form suitable for analysis and processing by a computer. Both color and gray scale optical image scanners are available. There is a need for improvement in scanning gray scale images with a color scanner, as described below.

In an optical image scanner, a light source is reflected from a document or transmitted through a transparent image onto an array of optical sensors, each sensor measuring the intensity of light received by that sensor. Gray scale scanners measure reflected or transmitted light intensity but do not distinguish colors. In dedicated gray scale scanners, a single broad spectrum light source may be projected onto the sensors, but typically, gray scale scanners use a relatively narrow spectrum light source having a yellow-green spectrum. In color scanners, light is typically separated into at least three spectral bands, for example red, green and blue bands. In some color scanners, color separation is accomplished by the use of multiple light sources, each having a different narrow color spectrum. In some color scanners, a single white light source is used and color separation is accomplished by the use of multiple color filters, each limiting the spectrum received by the optical sensors. In this application, a combination of devices to sense a narrow portion of the visual spectral range is called a channel. For example, most color scanners have a red channel, a blue channel and a green channel, where a channel may be implemented as a narrow spectrum light source and sensor or as a filter and sensor.

In some color scanners, a single sensor array is used, and the detection of the various color bands is sequential. In sequential scanners having multiple narrow spectrum light sources, the light sources are sequentially turned on and then off. In sequential scanners having multiple color filters, the filters are sequentially placed between the light source and the sensors. In other color scanners, the detection of the various color bands is parallel, typically by employing multiple sensor arrays to simultaneously receive the various color bands. For example, beam splitting filters may be used to direct one color component to one sensor array while directing other color components to other sensor arrays. Alternatively, each sensor array may have an individual filter so that different color components may be obtained simultaneously, but typically from different parts of the scanned image. For general background and an example of a color image scanner having parallel detection of the various color bands, see K. Douglas Gennetten and Michael J. Steinle, "Designing a Scanner with Color Vision," Hewlett-Packard Journal, 44, No. 4 (August, 1993) pp 52–58.

There are multiple reasons for generating gray scale digitized images using a color scanner. One primary use of gray scale images is for scanning pages of black and white text for optical character recognition. Even for images, the original image may be gray scale only, so that additional memory for color is not needed. Even if an original image is in color, it may be desirable to digitize the image as a gray scale image, for example to reduce the memory required to store the image, to print the image using a printer that only has black and white printing, or to perform image analysis that may not use color information. Typically, the amount of data stored for a digitized color image is three times the data required for a digitized gray scale image (assuming the light is separated into three bands).

In addition to memory considerations, scanning a gray scale image as a color image in a color scanner generally requires more time than scanning the gray scale image using a dedicated gray scale scanner. Therefore, it is also desirable to scan directly in gray scale with a color scanner to improve scanning speed. However, in some color scanner designs, gray scale scanning in a color scanner is inherently slower than gray scale scanning using a dedicated gray scale scanner. There are a number of approaches to generating a gray scale digitized image using a color scanner. For example, for scanners using multiple narrow spectrum light sources, all the sources may be turned on simultaneously. For scanners using filters, the scanner may use only one color filter (for example, green). Alternatively, for scanners using filters and multiple sensors, signals from all the sensors may be electronically (or arithmetically) combined to obtain a representation of the total visible light impinging on the sensors. Filters, however, necessarily reduce the intensity of light that impinges upon the optical sensors. With filtered light, longer exposure times are required to achieve a signal to noise ratio equivalent to that obtained using unfiltered light.

In color image scanners, there is a need for having the ability to scan gray scale images with the speed of a dedicated gray scale scanner. In addition, there is a need to accomplish this without requiring multiple light sources.

SUMMARY OF THE INVENTION

In a first embodiment, a sensor assembly is provided having three channels. Two of the channels have color filters. The third channel is receptive to the entire visual color range (white light). For gray scale scanning, only the white channel is used. Using a white channel for gray scale scanning maximizes the intensity of light impinging on the optical sensors, thereby maximizing scanning speed at any particular signal to noise ratio. In the example embodiment, each color filter is a bandpass filter passing one of two narrow color bands. For color scanning, three numbers representing digitized intensities from each of the three channels are linearly transformed into three colors of interest. In the example embodiment, buffering is required for color scanning. For color scanning, the charge time per scan line for the white channel is reduced relative to the charge time for the color channels to maximize the signal to noise ratio without saturation of the white channel sensors. An optional bandpass filter passing the visual range of wavelengths to the white channel provides better accuracy when using a light source that has significant intensity outside the human visual range.

In a second embodiment, a sensor assembly is provided having four channels. Three of the channels have color filters. The fourth channel is receptive to the entire visual color range (white light). For black and white or gray scale scanning, only the white channel is used.

DETAILED DESCRIPTION OF THE PREFERRED EMBODIMENT OF THE INVENTION

Figure 1:
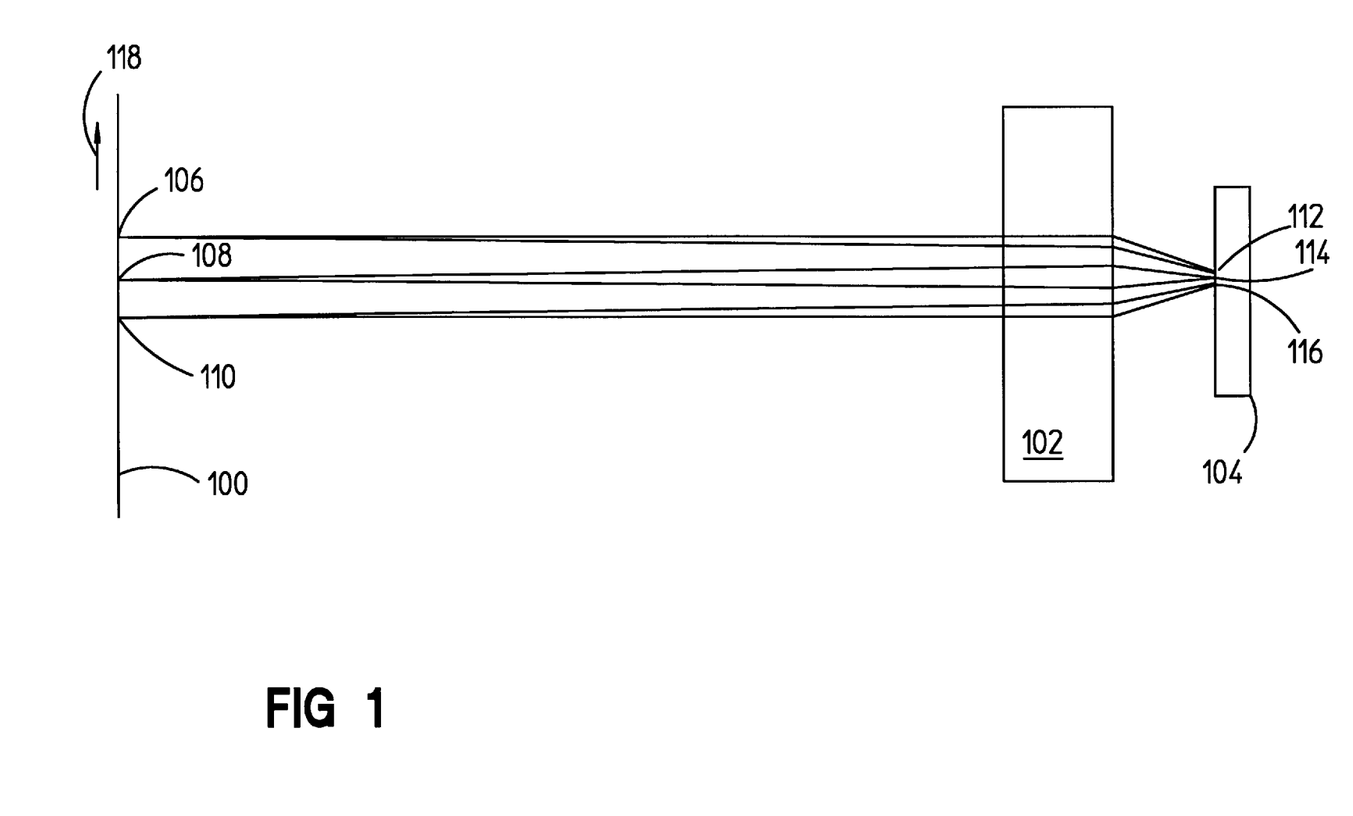
FIG. 1 is a simplified mechanical block diagram illustrating three lines of an image focussed onto three rows of a sensor assembly.

FIG. 1 is a simplified mechanical block diagram illustrating a basic scanner configuration. In FIG. 1, an image 100 is focussed by a lens system 102 onto a sensor assembly 104. In particular, three separate image scan lines (106, 108 and 110) are focussed onto three sensor array rows (112, 114 and 116 respectively). In the example embodiment, the sensor assembly comprises three rows of charge coupled devices (CCD's) as the light detection devices. As an example of scale, for typical commercially available sensor arrays, the width of the sensor array rows 112, 114 and 116 is on the order of 10 micrometers with a spacing between rows of 100 micrometers and the width of the image scan lines 106, 108 and 110 are on the order of 40 micrometers with a spacing between lines of 400 micrometers. In typical scanners, the length of the optical path from the image 100 to the sensor assembly 104 is longer than the length of the scanner so the optical path is folded via multiple mirrors. The lens assembly 102 is typically a complex arrangement of multiple lenses.

Figure 2A:
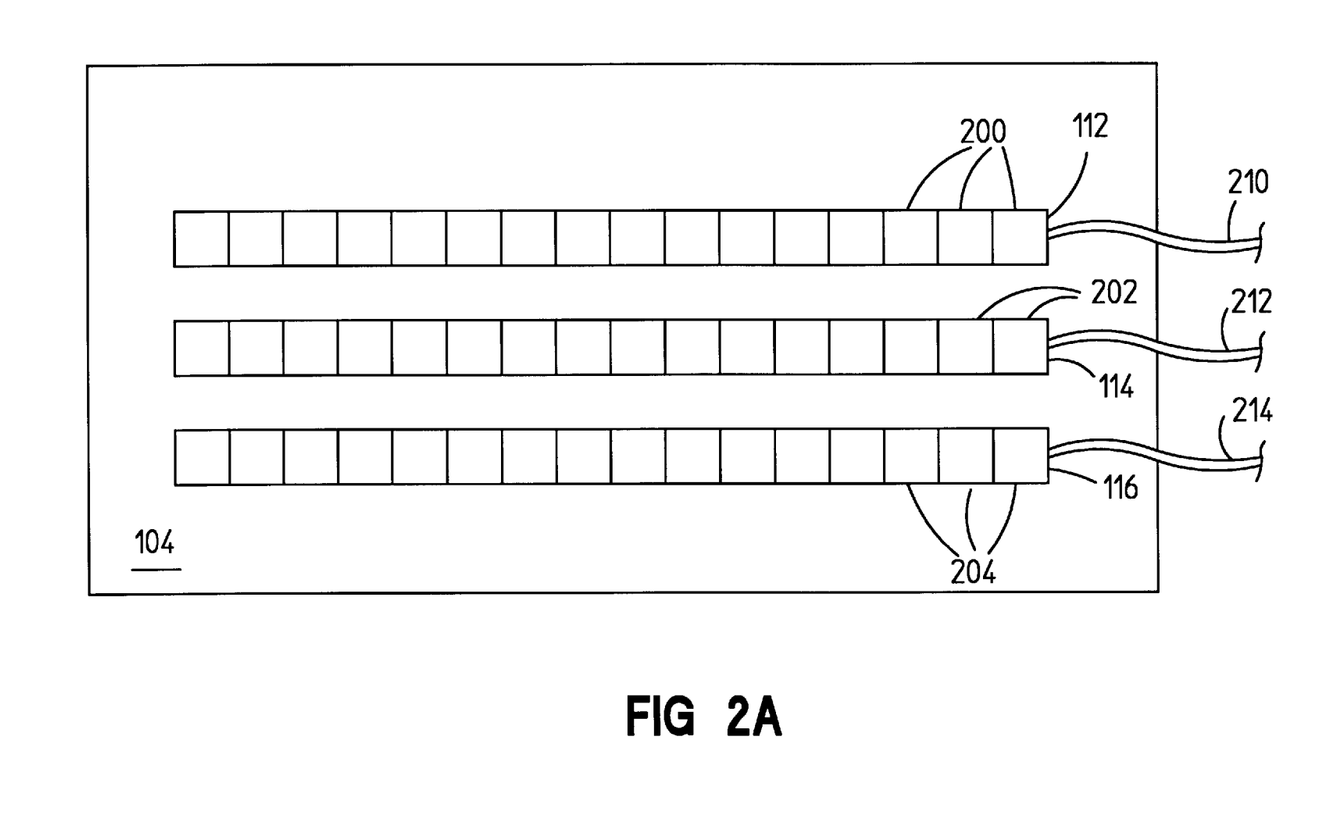
FIG. 2A is a simplified plane front view of a sensor assembly.

FIG. 2A is a simplified front view of the sensor assembly 104 depicted in FIG. 1. As illustrated in FIG. 2A, the sensor assembly has three rows of individual sensor elements. Row 112 is comprised of individual sensor elements 200, row 114 is comprised of individual sensor elements 202 and row 116 is comprised of individual sensor elements 204. For simplicity of illustration, only 16 sensor elements per row are depicted. In commercially available CCD sensor assemblies, the number of sensor elements per row is typically in the range of 2,000–7,000. FIG. 2A also depicts three pairs of signal leads, 210, 212 and 214. In the CCD assembly depicted in FIG. 2A, accumulated charge from each individual photosensitive element is transferred to a corresponding capacitor for serial output. Capacitor voltages are serially shifted out the signal leads so that for any one shift cycle, a voltage at a signal lead is a measurement of the light intensity received earlier by one photosensitive element.

In a typical scanner utilizing three sensor rows as depicted in FIG. 2A, all three sensor rows have a filter, either on the surface of the sensors or via external beam splitting. Typically, one row is filtered to detect light in a red band of wavelengths, a second row is filtered to detect light in a green band of wavelengths, and the third row is filtered to detect light in a blue band of wavelengths.

In the invention, two sensor rows are filtered and the third sensor row receives unfiltered (white) light (or perhaps filtered to exclude light outside the human visual range, as discussed further below). In the invention, for gray scale scanning, only the unfiltered (while) light signal is used. As will be discussed below, using the unfiltered light signal enables gray scale scanning to be faster than color scanning. For color scanning in the invention, three numbers representing white and two color bands are linearly transformed into three color intensities.

Figure 2B:
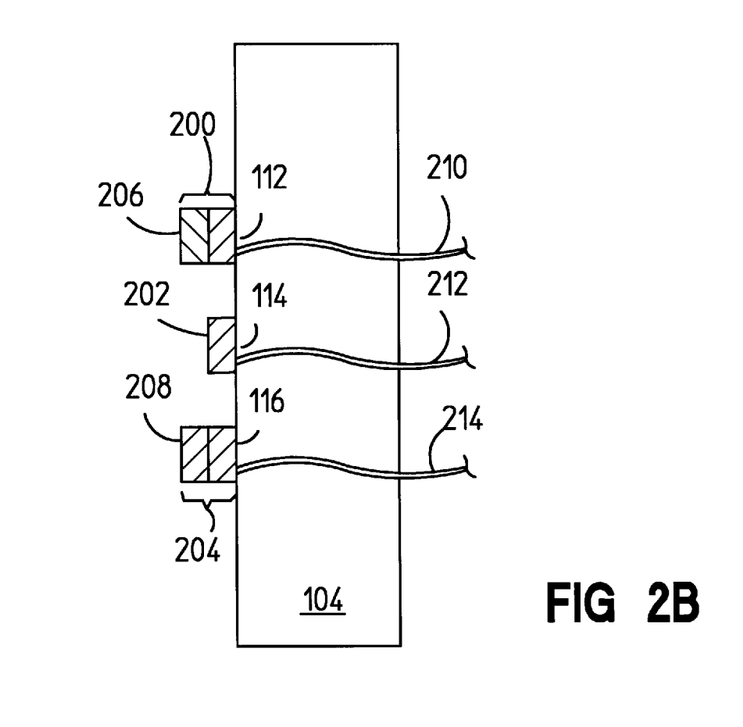
FIG. 2B is a simplified side view of the sensor assembly of FIG. 2A.

FIG. 2B is a simplified side view of the sensor assembly 104 as configured in the invention. In FIG. 2B, two sensor rows (112 and 116) are covered by color light filters (206 and 208, respectively). One row (114) remains uncovered. The choice of which one of three color bands is eliminated for sensor row 114 is arbitrary. Note also that the choice of which sensor row (112, 114, 116) is the unfiltered sensor row is arbitrary. FIG. 2B illustrates the middle sensor row 114 as being the unfiltered row but any one of the three sensor rows (112, 114 and 116) can be the unfiltered row.

Red, green and blue color bandpass filters are the most common filters used in color optical image scanners. Yellow, magenta and cyan bandstop filters may also be used. For purposes of example only, the sensor assembly 104 could provide approximate red, white, and blue intensity measurements. With ideal filters, green is white minus the sum of red and blue. In general, however, the filters are not ideal and a general linear transformation is required. In general, almost any three filters can be used as long as they pass or stop three non-identical bands of visible wavelengths, provided that these bands permit acceptable color reproduction using known principles of color science. Given three numbers representing the intensity of three bands, other colors can be obtained by multiplying the three measured values by a 3×3 transformation matrix. Using the example colors again, red, white, and blue may be linearly transformed into red, green and blue for display purposes. For printing purposes, red, white, and blue may be transformed into yellow, magenta, and cyan.

One additional potential problem may require an additional refinement of the color filters illustrated in FIG. 2B. In the typical arrangement where all three sensor rows have filters and where the filters are bandpass filters, light wavelengths outside the human visual range (wavelengths in the range from 400 to 700 nanometers) are inherently excluded by the bandpass filters. If sensor row 114 has no filter, light outside the human visual range but within the range of photosensitivity of the sensors may distort the intensity measured by the sensors. If the light source used by the scanner has significant intensity outside the human visual range, then sensor row 114 may need a white bandpass filter passing the range from 400 to 700 nanometers. Finally, it may also be desirable that this white filter also suppress some visible wavelengths to improve color reproduction per known principles of color science. For example, rather than a strictly white filter, a broadband dominantly green filter that also passes substantial amounts of red and blue light might be employed. In general, the white filter must be significantly broader in bandwidth than a typical color filter in order to achieve faster gray scale scans.

Referring back to FIG. 1, in order to scan the entire image 100, the image 100 must move relative to the sensor assembly 104. It does not matter whether the image 100 moves past a stationary sensor assembly 104 or whether the sensor assembly 104 moves past a stationary image 100. Note that for an optical arrangement as illustrated, three different scan lines (106, 108, and 110) on image 100 are being focussed on sensor assembly 104. Assume for discussion that the direction of relative movement is as illustrated by arrow 118 in FIG. 1. With relative movement as indicated by arrow 118, image scan line 106 depicted as currently focussed onto the sensor row 112 was earlier focussed onto the sensor row 114 and earlier still was focussed onto sensor row 116. The color of a particular picture element from image scan line 106 is obtained by linearly transforming the color measurement at sensor row 112 along with color measurements obtained earlier from sensor rows 116 and 114. Assuming that the voltage measurements from the CCD elements are converted into computer readable numbers, numerical memory buffers are needed for measurement numbers from sensor rows 114 and 116.

Figure 3:
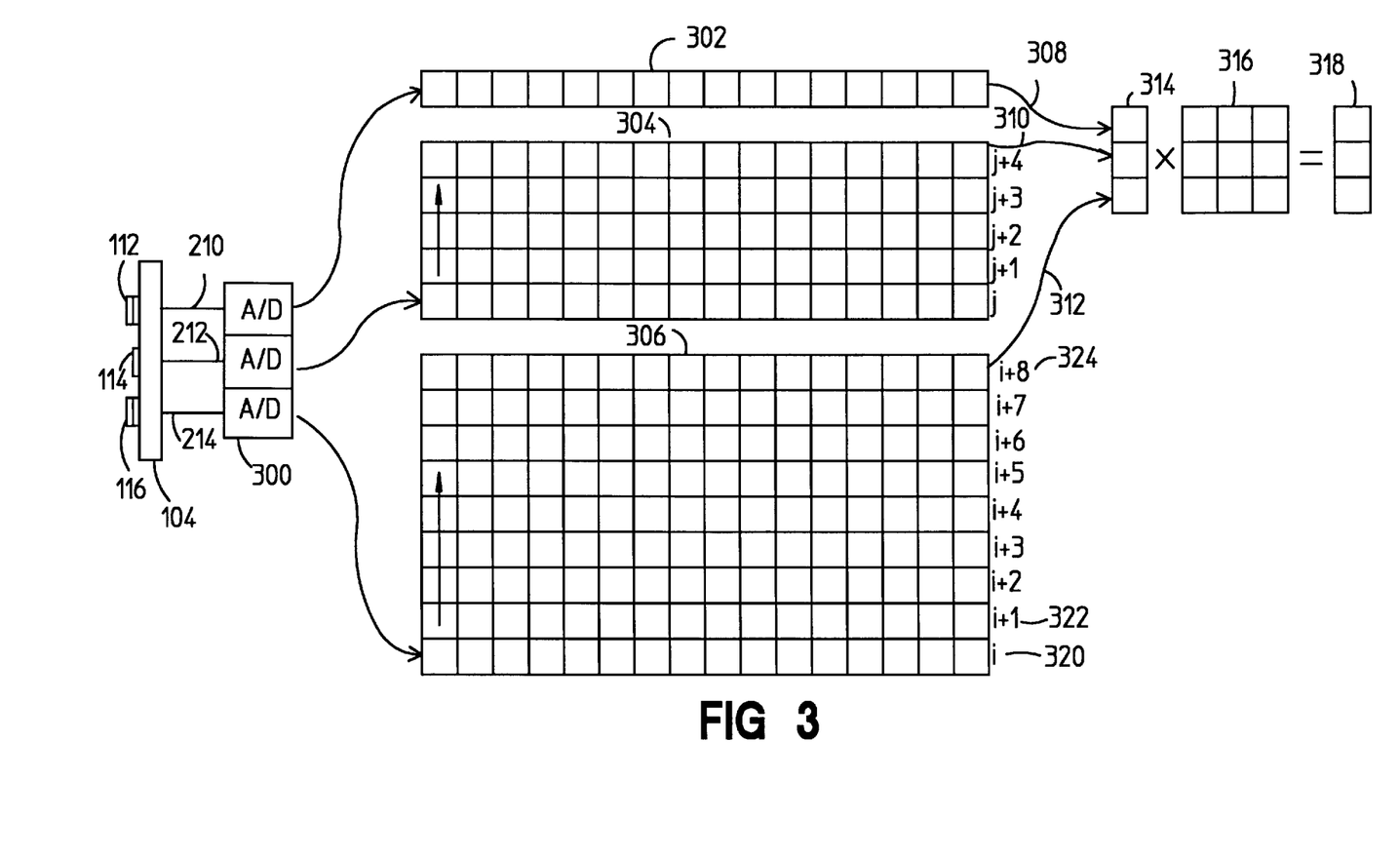
FIG. 3 is a block diagram schematic of the sensor assembly in conjunction with memory and arithmetic units.

FIG. 3 illustrates the memory buffers and arithmetic elements required for color scanning. In FIG. 3, analog voltages from the CCD rows are converted into numerical values by analog to digital (A/D) converters 300. Numerical values from all the CCD's in sensor row 116 are sequentially stored into memory buffer 306. To facilitate discussion, memory buffer 306 is depicted as being configured into an array of rows and columns, but can be alternatively configured in a serpentine serial fashion, as a first-in-first-out (FIFO) stack buffer, or effectively configured into rows and columns using random access memory. When the image 100 (FIG. 1) moves relative to the sensor assembly 104 so that sensor row 116 is focussed onto a new scan line, the stored row of numbers in the memory buffer 306 is effectively shifted (upward in FIG. 3) from row i (320) to row i+1 (322). When the image 100 (FIG. 1) has moved a distance relative to the sensor assembly 104 corresponding to the distance between image scan lines 106 and 110 (FIG. 1), then the top row i+8 (324) of memory buffer 306 contains numerical values from an earlier scan of scan line 106, at the same time that sensor row 112 is receiving light from scan line 106.

In FIG. 3, the memory buffer 306 is depicted as corresponding to a spacing of 8 image scan lines between image scan lines 106 and 110. The number of lines of buffering required depends on the optics and the spacing of the sensor rows. For the dimensions given in the first paragraph of the description, there are 20 image scan lines between image scan lines 106 and 110, thereby requiring a corresponding 20 rows of buffer memory in memory buffer 306. Likewise, numerical information from sensor row 114 must be buffered in a memory buffer 304. Finally, in FIG. 3, numerical information from sensor row 112 needs only a single row of memory 302, if any.

Also illustrated in FIG. 3 are the arithmetic elements required to obtain three colors in a color scan. For one picture element at a time, a buffered number 312 from sensor row 116, a corresponding number 310 from sensor row 114, and a corresponding number 308 from sensor row 112 form a 3×1 matrix 314. Matrix 314 is multiplied by a predetermined 3×3 matrix 316 to generate a triplet of numerical values 318. Numerical values 318 may be used directly for display or printing as appropriate.

Light impinging on the photosensitive portion of a CCD results in charge that accumulates on a capacitor, resulting in a voltage on the capacitor. Typically, the capacitor is initially discharged and then is allowed to charge as it is exposed to light. The longer the exposure, the better the signal to noise ratio. There is, however, a finite voltage limit (saturation).

In the arrangement illustrated in FIG. 2B, the intensity of the unfiltered light impinging on sensor row 114 is generally greater than the intensity of light passing through the fillers on rows 112 and 116. For example, in the case of white light and assuming ideal filters, the intensity of light impinging on sensor row 114 is three times the intensity of light passing through the filters on rows 112 and 116. Given a fixed exposure time that enables the filtered rows 112 and 116 to achieve maximum signal to noise ratios, the sensors in the unfiltered sensor row 114 might saturate. Therefore, to maximize the signal to noise ratio without saturating the unfiltered sensors, the unfiltered sensor row 114 needs to be exposed for a shorter amount of time than the two filtered sensor rows 112 and 116. If the filters 206 and 208 were ideal and if the charge rate of the sensors in rows 112, 114 and 116 were linear, then the unfiltered sensor row 114 charge time should be one third the charge time of the two filtered sensor rows 112 and 116. Typical commercially available dye based filters, however, are not ideal. For example, dye based filters passing blue wavelengths typically reduce the light intensity within the passband more than fillers passing red or green wavelengths. Therefore, to maximize the signal to noise ratio, the charge time of two of the three sensor rows needs to be reduced relative to the charge time of the sensor row that most restricts light intensity. In typical commercially available CCD arrays, each sensor row can be independently discharged. A straightforward solution to adjustment of charging times is to adjust the discharge time of each row so that all rows are sampled simultaneously at the end of the charge time (effectively adjusting the charging start lime of each row).

Figure 4:
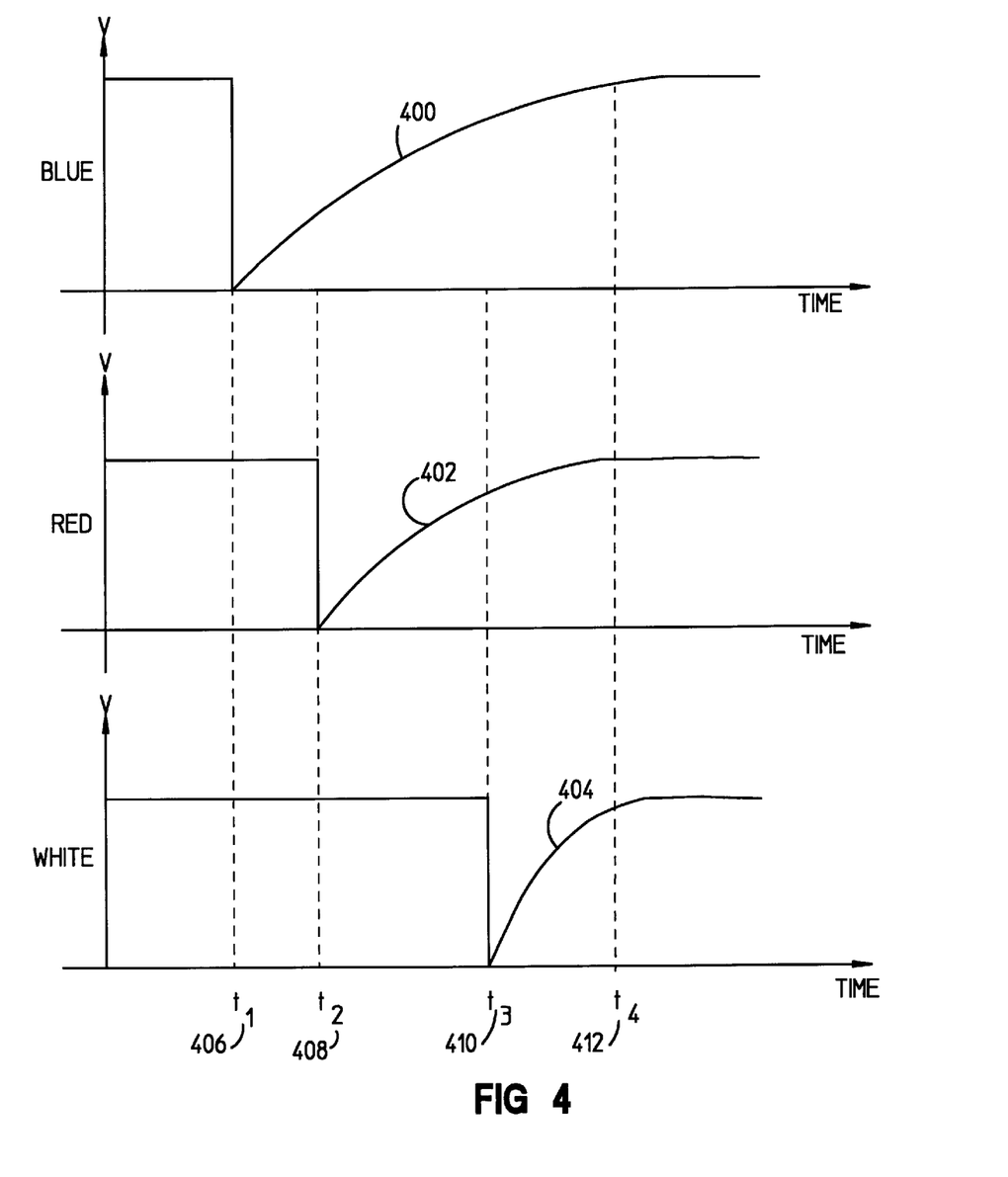
FIG. 4 is a timing diagram illustrating variable charge starting times for the different sensor rows when scanning color images.

FIG. 4 illustrates the relative timing for discharge and reading of three sensor rows when scanning color images. Waveform 400 illustrates the voltage on a sensor element (capacitor) of a row receiving blue light. Waveform 402 illustrates the voltage on a sensor element of a row receiving red light. Waveform 404 illustrates the voltage on a sensor element of a row receiving white light. At time $t_1$ (406), the blue sensor is discharged. The blue sensor receives the least light intensity and therefore is discharged first. At time $t_2$ (408), the red sensor is discharged. The white sensor is discharged last at time $t_3$ (410). All three sensor voltages are then read simultaneously at time $t_4$ (412) for digitizing.

When scanning a gray scale image, the above discussion of buffering and charge time adjustment between sensor rows is irrelevant. When scanning a gray scale image, only the unfiltered sensor row 114 is used and the charge times are reduced to the minimum required to maximize the signal to noise ratio for the unfiltered sensor row 114. For example, in FIG. 4, for gray scale scanning, the time from $t_1$ (406) to $t_3$ (410) can be eliminated. In addition, no buffering of numerical data is needed. Therefore, gray scale scanning can be made substantially faster than color scanning.

Figure 5:
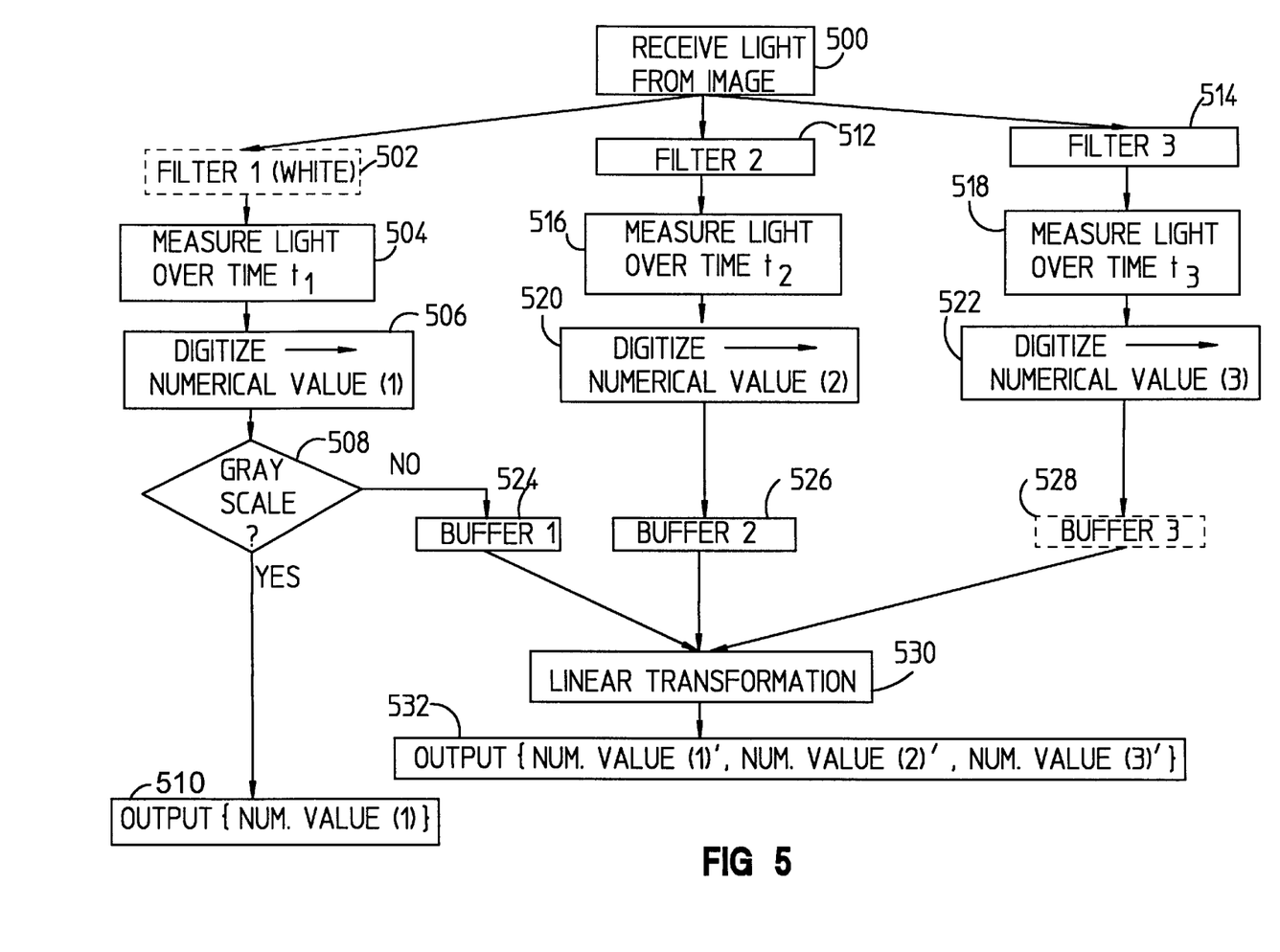
FIG. 5 is a flow chart illustrating the method of the invention.

FIG. 5 illustrates the method of the invention. The sensor assembly receives light from the image (500). For one row, the filtering step (502) is depicted as a dashed box to illustrate that, preferably, no filter is required but a visual spectrum (white) bandpass filter may be needed if the light source has significant light outside the visual spectrum. The light for the unfiltered row is measured over a finite period of time (504), and digitized into a first numerical value (506). For gray scale scanning, the first numerical value is the sensor system output (510).

For color scanning, for the two color filtered rows, light passes through color filters (512, 514), is measured over a period of time (516, 518) and is digitized into second and third digital values. Digitized values from at least two rows are buffered (524, 526 and 528) (recall that one buffer may not be necessary as depicted by box 528). Then, a linear transformation is computed (532) (as in FIG. 3, 314, 316 and 318), generating three transformed numbers (532). As illustrated in FIG. 5, fewer steps are needed for gray scale scanning.

Figure 6A:
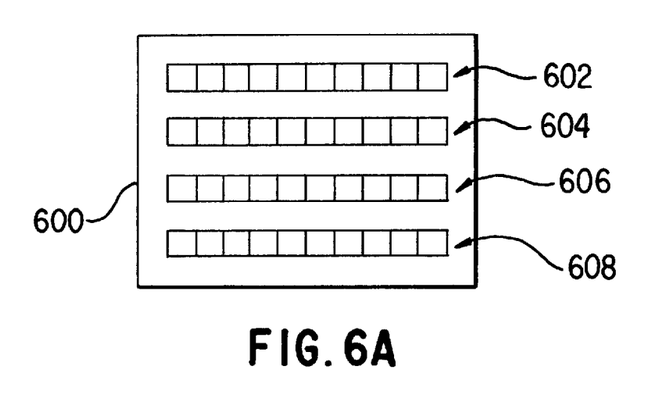
FIG. 6A is a simplified plane front view of an alternative sensor assembly.
Figure 6B:
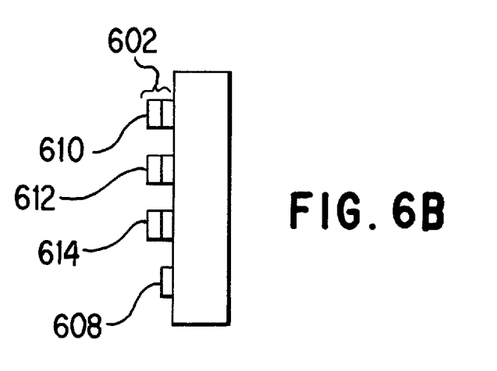
FIG. 6B is a simplified side view of the sensor assembly of FIG. 6A.

FIG. 6A illustrates an alternative embodiment in which a sensor array 600 has four rows of sensors (602, 604, 606, 608), of which three rows are filtered and one row receives the entire visual color range (white light). FIG. 6B is a side view in which row 602 is filtered by filter 610, row 604 is filtered by filter 612, row 606 is filtered by filter 614 and row 608 is unfiltered or filtered to receive the human visual color range. The choice of which row is unfiltered is arbitrary. Black and white or gray scale scanning is performed using the unfiltered row (608) only and therefore has the same speed advantages as discussed above in conjunction with FIGS. 4 and 5. Color scanning is performed using the three filtered rows (602, 604, 606). Alternatively, color scanning may use all four rows (602, 604, 606, 608). Recall from the discussion above that in general, almost any three filters can be used as long as they pass or stop three non-identical bands of visible wavelengths, provided that these bands permit acceptable color reproduction using known principles of color science. Given three numbers representing the intensity of three bands, or four numbers representing the intensity of four bands (three filtered and one white), other colors can be obtained by multiplying the three measured values by a 3×3 transformation matrix or the four measured values by a 3×4 transformation matrix. Therefore, for color scanning using the array of FIGS. 6A and 6B, the only change relative to the array illustrated in FIGS. 2A and 2B is an appropriate adjustment in exposure times as discussed above in conjunction with FIG. 4 and an appropriate change in the numbers used in the linear transformation (FIG. 5, 530 and FIG. 3, 316). Typically, filters 610, 612 and 614 will be {red, green, blue } or {yellow, magenta, cyan}. However, other non-white combinations may be used.

Figure 7:
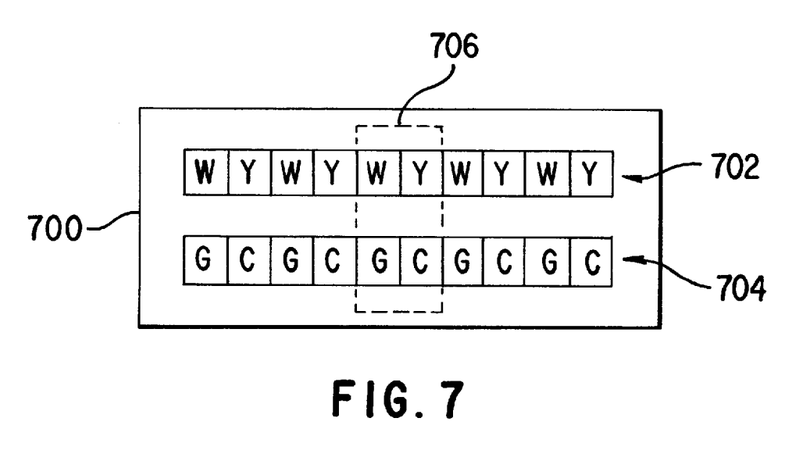
FIG. 7 is a simlified plane front view of an alternative sensor assembly.

Each of the embodiments described above has filters arranged such that all sensor elements within one row receive white light or light filtered by one particular filter. There are other sensor arrays in which the filters are arranged in a matrix or mosaic pattern. Typically, four sensor elements over two rows define a single picture element (pixel). FIG. 7 illustrates a two row sensor array 700 in which the sensor elements of a first row 702 are filtered alternately white and yellow. The sensor elements in a second row 704 are filtered alternately green and cyan. A cluster of four sensor elements 706 (one of each color) defines a single pixel. Typically, a scan of a gray scale image using a sensor array as illustrated in FIG. 7 requires scanning using all sensor elements and performing an appropriate color transformation. In prior art scanners using matrix sensor arrays that include white sensors, the speed of scanning may be limited by the elements receiving the least intensity. The principal disclosed for the sensor arrays of FIGS. 2A and 6A is equally applicable to the array illustrated in FIG. 7. That is, the white sensor elements inherently receive more light per unit of time than the sensor elements receiving narrow band filtered light. A black and white or gray scale scan using only the white sensor elements for each pixel is inherently faster than a scan requiring filtered sensor elements to integrate an equivalent amount energy as white elements.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A sensor assembly for an optical image scanner comprising:

a first row of sensor elements, each sensor element in the first row receiving light that is unfiltered and having an analog output signal proportional to the received light; and a plurality of additional rows of sensor elements, each sensor element in the additional rows receiving light that is filtered and having an analog output signal proportional to the received light.

2. A sensor assembly as in claim 1 further comprising:

a first analog-to-digital converter, receiving the analog output signals from the first row of sensor elements and outputting first numerical values representing an amplitude of the received analog signals;

a plurality of second analog-to-digital converters, each receiving the analog output signal from one of the additional rows of sensor elements and outputting second numerical values representing an amplitude of the received analog signals; and an arithmetic unit, sequentially receiving one of the first numerical values and the second numerical values and performing a linear transformation on the received values.

3. A sensor assembly as in claim 2 further comprising:

a first memory buffer, receiving the first numerical values and outputting the received numerical values on a first-in first-out basis to the arithmetic unit; and a plurality of second memory buffers, one second memory buffer for each row of the plurality of additional rows of sensor elements, each second memory buffer receiving the second numerical values from its corresponding row of sensor elements and outputting the received second numerical values on a first-in first-out basis to the arithmetic unit.

4. An optical image scanner comprising:

a sensor assembly, receiving light from an image, the sensor assembly further comprising:

a first row of sensor elements, each sensor element in the first row of sensor elements receiving light from the image that is unfiltered and having an analog output signal proportional to the received light;

a plurality of light filters; and a plurality of additional rows of sensor elements, each additional row of sensor elements having one corresponding light filter in the plurality of light filters, the light filters disposed such that each sensor element in each additional row of sensor elements receives light from the image that is filtered by the one corresponding light filter, each sensor element in each additional row of sensor elements having an analog output signal proportional to the received light.

5. The optical image scanner of claim 4 further comprising:

a first analog-to-digital converter, receiving the analog signals from the first row of sensor elements and outputting first numerical values representing amplitudes of the received analog signals;

a plurality of additional analog-to-digital converters, each receiving the analog signals from one of the additional rows of sensor elements and outputting numerical values representing amplitudes of the received analog signals; and an arithmetic unit, receiving the first numerical values and the additional numerical values and performing a linear transformation on the received values.

6. The optical image scanner of claim 5 further comprising:

a first memory buffer for the first row of sensor elements, receiving the first numerical values and outputting the received first numerical values on a first-in first-out basis to the arithmetic unit; and a plurality of additional memory buffers having a one to one correspondence with the plurality of additional rows of sensor elements, each receiving the additional numerical values from the corresponding additional row of sensor elements and outputting the received second numerical values on a first-in first-out basis to the arithmetic unit.

7. A sensor assembly for an optical image scanner comprising:

a first row of sensor elements, each sensor element in the first row of sensor elements receiving light that is filtered by a bandpass light filter passing substantially all the human visible light spectrum and having an analog output signal proportional to the received light; and a plurality of additional rows of sensor elements, each sensor element in each additional row of sensor elements receiving light that is filtered by a light filter passing substantially less than the human visible light spectrum and having an analog output signal proportional to the received light.

8. A sensor assembly as in claim 7 further comprising:

a first analog-to-digital converter, receiving analog signals from the first row of sensor elements and outputting first numerical values representing amplitudes of the received analog signals;

a plurality of additional analog-to-digital converters, each receiving analog signals from one of the additional rows of sensor elements and outputting additional numerical values representing amplitudes of the received analog signals; and an arithmetic unit, receiving the first numerical values and the additional numerical values and performing a linear transformation on the received values.

9. A sensor assembly as in claim 8 further comprising:

a first memory buffer, receiving the first numerical values and outputting the received first numerical values on a first-in first-out basis to the arithmetic unit; and a plurality of additional memory buffers, one additional memory buffer for each additional row of sensor elements, each additional memory buffer receiving the second numerical values from its corresponding additional row of sensor elements and outputting the received second numerical values on a first-in first-out basis to the arithmetic unit.

10. An optical image scanner comprising:

a sensor assembly, receiving light from an image, the sensor assembly further comprising:

a first row of sensor elements, each sensor element in the first row of sensor elements receiving light from the image that is filtered by a first bandpass light filter passing substantially all the human visible light spectrum and having an analog output signal proportional to the received light;

a plurality of additional light filters, each additional light filter passing substantially less than the human visible light spectrum; and a plurality of additional rows of sensor elements, each additional row of sensor elements having one corresponding light filter in the plurality of additional light filters, the additional light filters disposed such that each sensor element in each additional row of sensor elements receives light from the image that is filtered by the one corresponding additional light filter, each sensor element in each additional row of sensor elements having an analog output signal proportional to the received light.

11. The optical image scanner of claim 10 further comprising:

a first analog-to-digital converter, receiving analog signals from the first row of sensor elements and outputting first numerical values representing amplitudes of the received analog signals;

a plurality of additional analog-to-digital converters, each receiving analog signals from the sensor elements in each additional row of sensor elements and outputting second numerical values representing amplitudes of the received analog signals; and an arithmetic unit, receiving the first numerical values and the additional numerical values and performing a linear transformation on the received values.

12. The optical image scanner of claim 11 further comprising:

a first memory buffer for the first row of sensor elements, receiving the first numerical values and outputting the received first numerical values on a first-in first-out basis to the arithmetic unit; and a plurality of additional memory buffers having a one to one correspondence with the plurality of additional rows of sensor elements, each receiving the additional numerical values from the corresponding additional row of sensor elements and outputting the received additional numerical values on a first-in first-out basis to the arithmetic unit.

13. In an color optical image scanner, a method of measuring light intensity within a particular spectral band, the method comprising the following steps:

(a) receiving the light unfiltered, by a first row of sensor elements;

(b) filtering the light through a first bandpass light filter for a second row of sensor elements;

(c) filtering the light through a second bandpass light filter for a third row of sensor elements;

(d) digitizing an analog output from the first, second and third rows of sensor elements into first, second and third numerical values respectively; and (e) computing the light intensity within the particular spectral band as a linear transformation of the first, second and third numerical values.

14. In a color optical image scanner, a method of scanning gray scale and color images, the method comprising the following steps:

(a) exposing a first sensor element to light to be measured for a first exposure time;

(b) digitizing an analog output from the first sensor element into a first numerical value;

(c) exposing a second sensor element to the light to be measured filtered by a second filter for a second exposure time, the second exposure time greater than the first exposure time;

(d) exposing a third sensor element to the light to be measured filtered by a third filter for a third exposure time, the third exposure time greater than the first exposure time;

(e) digitizing an analog output from the second and third sensor elements into second and third numerical values respectively;

(f) computing three transformed numerical values as a linear transformation of the first, second, and third numerical values;

(g) scanning a gray scale image by repeating steps (a) and (b); and (h) scanning a color image by repeating steps (a) through (f).

15. In an color optical image scanner, a method of measuring an intensity of light within a particular spectral band, the method comprising the following steps:

(a) filtering the light through a first bandpass light filter to a first row of sensor elements, the first bandpass filter passing substantially all the human visible light spectrum;

(b) filtering the light through a second bandpass light filter to a second row of sensor elements, the second bandpass filter passing substantially less than the human visible light spectrum;

(c) filtering the light through a third bandpass light filter to a third row of sensor elements, the third bandpass filter passing substantially less than the human visible light spectrum;

(d) digitizing an analog output from the first, second and third rows of sensor elements into first, second and third numerical values respectively; and (e) computing the light intensity within the particular spectral band as a linear transformation of the first, second, and third numerical values.

16. In a color optical image scanner, a method of scanning gray scale and color images, the method comprising the following steps:

(a) exposing a first sensor element to light to be measured filtered by a first filter for a first exposure time, the first filter passing substantially all the human visible light spectrum;

(b) digitizing an analog output from the first sensor element into a first numerical value;

(c) exposing a second sensor element to the light to be measured filtered by a second filter for a second exposure time, the second exposure time greater than the first exposure time, the second filter passing substantially less than the human visible light spectrum;

(d) exposing a third sensor element to the light to be measured filtered by a third filter for a third exposure time, the third exposure time greater than the first exposure time, the third filter passing substantially less than the human visible light spectrum;

(e) digitizing an analog output from the second and third sensor elements into second and third numerical values respectively;

(f) computing three transformed numerical values as a linear transformation of the first, second and third numerical values;

(g) scanning a gray scale image by repeating steps (a) and (b); and (h) scanning a color image by repeating steps (a) through (f).

17. A sensor assembly for an optical image scanner comprising:

a first row of sensor elements, each sensor element in the first row receiving light that is filtered by a first filter;

a second row of sensor elements, each sensor element in the second row receiving light that is filtered by a second filter;

a third row of sensor elements, each sensor element in the third row receiving light that is filtered by a third filter; and a fourth row of sensor elements, each sensor element in the fourth row receiving light that is not filtered.

18. A color scanner comprising:

a sensor array having a plurality of sensor elements, at least one of the sensor elements receiving light that is not filtered and at least two of the sensor elements receiving light that is filtered;

a pixel at a particular position corresponding to one of the sensor elements that receives light that is not filtered and at least two of the sensor elements that receive light that is filtered;

for a color scan the color of a particular pixel being determined by a color transformation of light measured by all of the sensor elements corresponding to the particular pixel; and for a gray scale scan, the color of the particular pixel being determined by light measured by the one sensor element, corresponding to the particular pixel, that receives light that is not filtered.

19. In a color optical image scanner, a method of scanning gray scale and color images, the method comprising the following steps:

(a) exposing a first sensor element to light to be measured filtered by a first filter for a first exposure time, the first filter passing substantially all the human visible light spectrum;

(b) digitizing an analog output from the first sensor element into a first numerical value;

(c) exposing a second sensor element to the light to be measured filtered by a second filter for a second exposure time, the second exposure time greater than the first exposure time, the second filter passing substantially less than the human visible light spectrum;

(d) exposing a third sensor element to the light to be measured filtered by a third filter for a third exposure time, the third exposure time greater than the first exposure time, the third filter passing substantially less than the human visible light spectrum;

(e) exposing a fourth sensor element to the light to be measured filtered by a fourth filter for a fourth exposure time, the fourth exposure time greater than the first exposure time, the fourth filter passing substantially less than the human visible light spectrum;

(f) digitizing an analog output from the second, third and fourth sensor elements into second, third and fourth numerical values respectively;

(g) computing three transformed numerical values as a linear transformation of the second, third and fourth numerical values;

(h) scanning a gray scale image by repeating steps (a) and (b); and (i) scanning a color image by repeating steps (c) through (g).

20. In a color optical image scanner, a method of scanning gray scale and color images, the method comprising the following steps:

(a) exposing a first sensor element to light to be measured filtered by a first filter for a first exposure time, the first filter passing substantially all the human visible light spectrum;

(b) digitizing an analog output from the first sensor element into a first numerical value;

(c) exposing a second sensor element to the light to be measured filtered by a second filter for a second exposure time, the second exposure time greater than the first exposure time, the second filter passing substantially less than the human visible light spectrum;

(d) exposing a third sensor element to the light to be measured filtered by a third filter for a third exposure time, the third exposure time greater than the first exposure time, the third filter passing substantially less than the human visible light spectrum;

(e) exposing a fourth sensor element to the light to be measured filtered by a fourth filter for a fourth exposure time, the fourth exposure time greater than the first exposure time, the fourth filter passing substantially less than the human visible light spectrum;

(f) digitizing an analog output from the second, third and fourth sensor elements into second, third and fourth numerical values respectively;

(g) computing three transformed numerical values as a linear transformation of the first, second, third and fourth numerical values;

(h) scanning a gray scale image by repeating steps (a) and (b); and (i) scanning a color image by repeating steps (a) through (g).

* * * * *